United States Patent [19]
Yevick

[11] 4,074,933
[45] Feb. 21, 1978

[54] MICRO INFORMATION INDEXING READER

[75] Inventor: George J. Yevick, Leonia, N.J.

[73] Assignee: Izon Corporation, Stamford, Conn.

[21] Appl. No.: 714,223

[22] Filed: Aug. 13, 1976

[51] Int. Cl.² ............... G03B 21/14; G02B 27/00
[52] U.S. Cl. .................. 353/27 R; 350/167; 353/38; 353/120; 354/115; 354/120
[58] Field of Search ............ 353/27 R, 27 A, 120, 353/32, 38; 350/167; 354/115, 120

[56] References Cited
U.S. PATENT DOCUMENTS

| 3,712,724 | 1/1973 | Courtney-Pratt | 353/38 |
| 3,853,395 | 12/1974 | Yevick | 353/38 |
| 3,864,034 | 2/1975 | Yevick | 353/38 |
| 3,868,179 | 2/1975 | Zeutschel | 353/27 R |

Primary Examiner—Steven L. Stephan
Attorney, Agent, or Firm—Thomas J. Greer, Jr.

[57] ABSTRACT

A micro information reader defined by a thin container open at one side. The open side receives a micro information carrier. The carrier and the thin container are provided with interengaging ridges which function as detents to index the micro information carrier with respect to fixed illumination sources and projection lenses on the reader.

17 Claims, 8 Drawing Figures

MICRO INFORMATION INDEXING READER

This invention relates to an optical device of the type shown in my U.S. Pat. Nos. 3,824,609 and 3,950,769. Additional examples of the field in which this invention exhibits utility are given in my U.S. Pat. Nos. 3,864,034 and 3,853,395, all four which are incorporated by reference. This invention exhibits particularly utility as a microfiche reader.

Microfiche recorders and readers exhibit utility in the storage of information; vast quantities capable of being stored in very compact areas. A number of microfiche reader devices are known to workers in this art, such as is shown in the noted four patents and the practice of this invention admits of a relatively inexpensive and reliable reader. In general, the reader according to the practice of this invention is defined by a relatively thin container having a generally flat cavity therein, the cavity being open on one side. A microfiche carrier which carries a microfiche is positioned within the cavity through the open edge of the container. The microfiche is adapted to be illuminated by what are now conventional methods in this art, such as by totally internally reflecting optical fibers whose ends are placed in optical alignment with microimages on the microfiche. The light passing through and exiting from the forward ends of these optic fibers is modulated by the microimages and passes to one or more lenses for projection on a viewing screen or the equivalent. The microfiche carrier and the relatively thin container of this invention are each provided with cooperating and inter-engaging ridges. The devices are formed of a transparent plastic, such as poly methylmethacrylate, all as known to workers in this art. By virtue of the inherent resiliency of the relatively thin container and the micofiche carrier, the carrier may be indexed relative to container and thereby indexed relative to sources illumination. This admits of a viewer changing scenes to thereby successively read distinct information sets.

Figure 2:
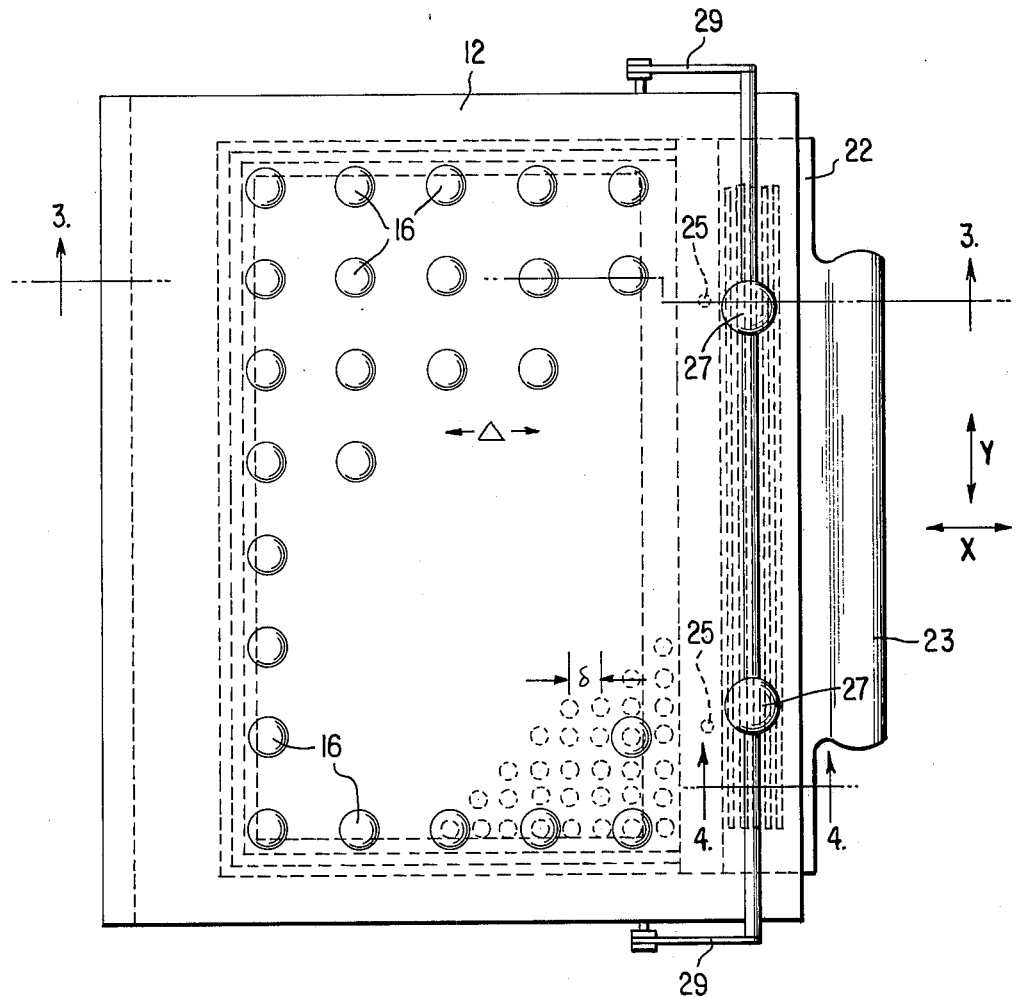
FIG. 2 is a plan view of the microfiche reader and carrier of FIG. 1 when they are assembled.
Figure 3:
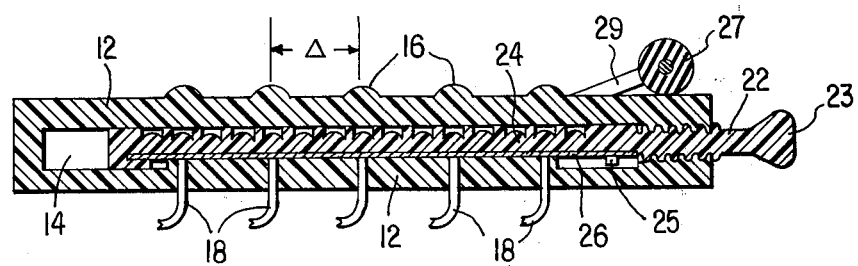

FIG. 3. is a view taken along section 3—3 of FIG. 2.

Figure 4:
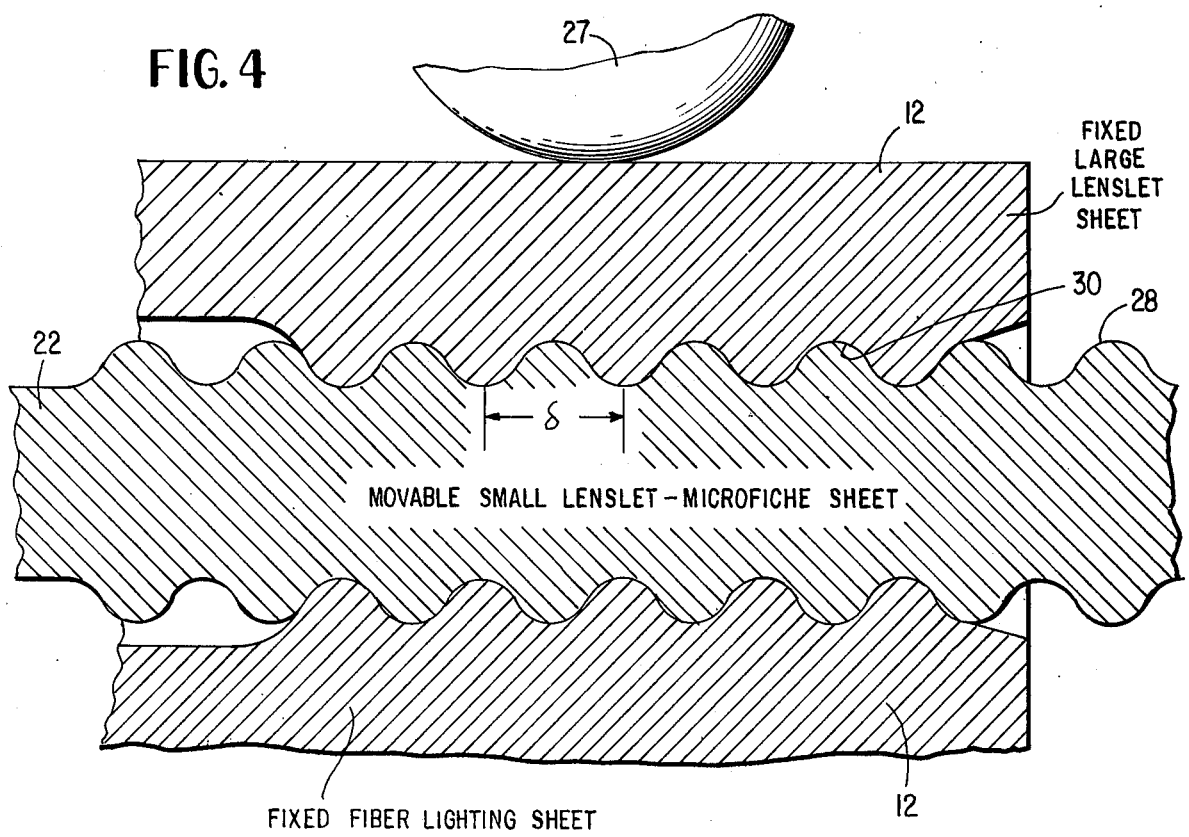

FIG. 4 is a view taken along section 4–4 of FIG. 2.

Figure 5:
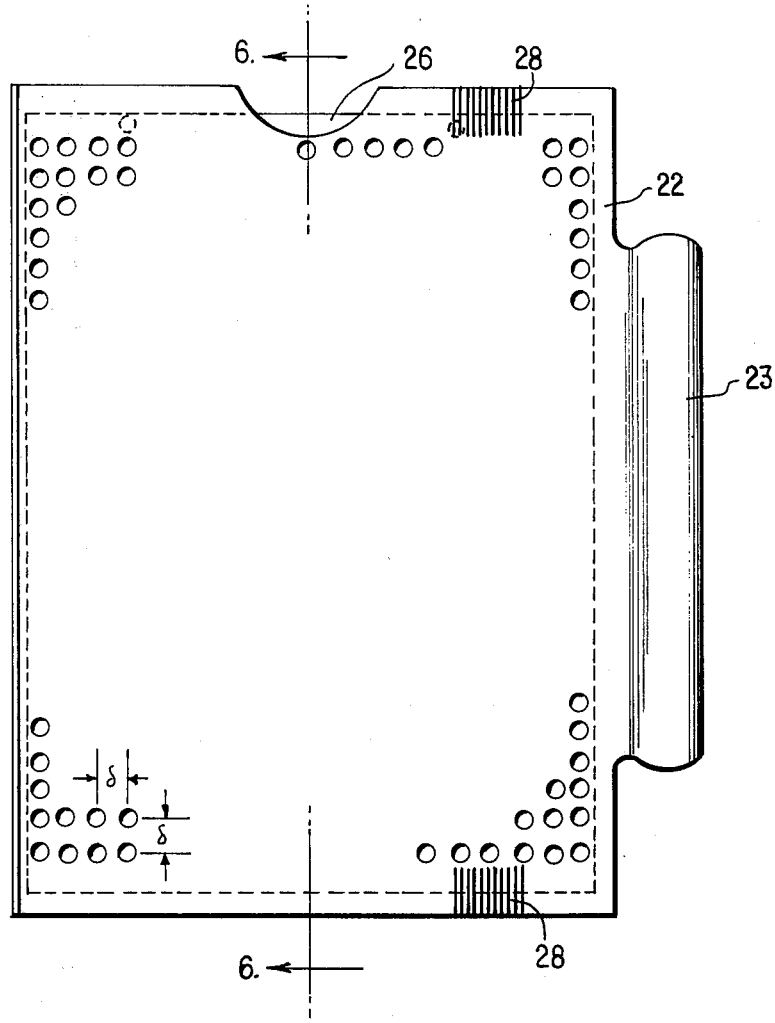

FIG. 5 is a top plan view of a modification of a microfiche carrier.

Figure 6:
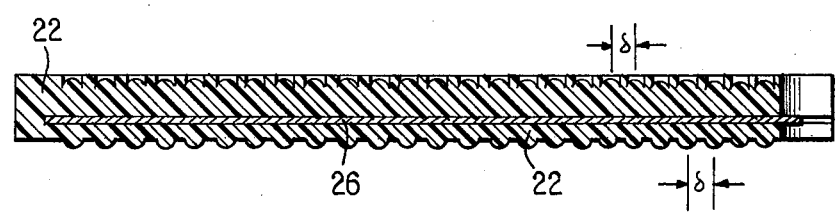

FIG. 6 is a view similar to FIG. 3 and illustrates an embodiment of the indexing construction.

Figure 7:
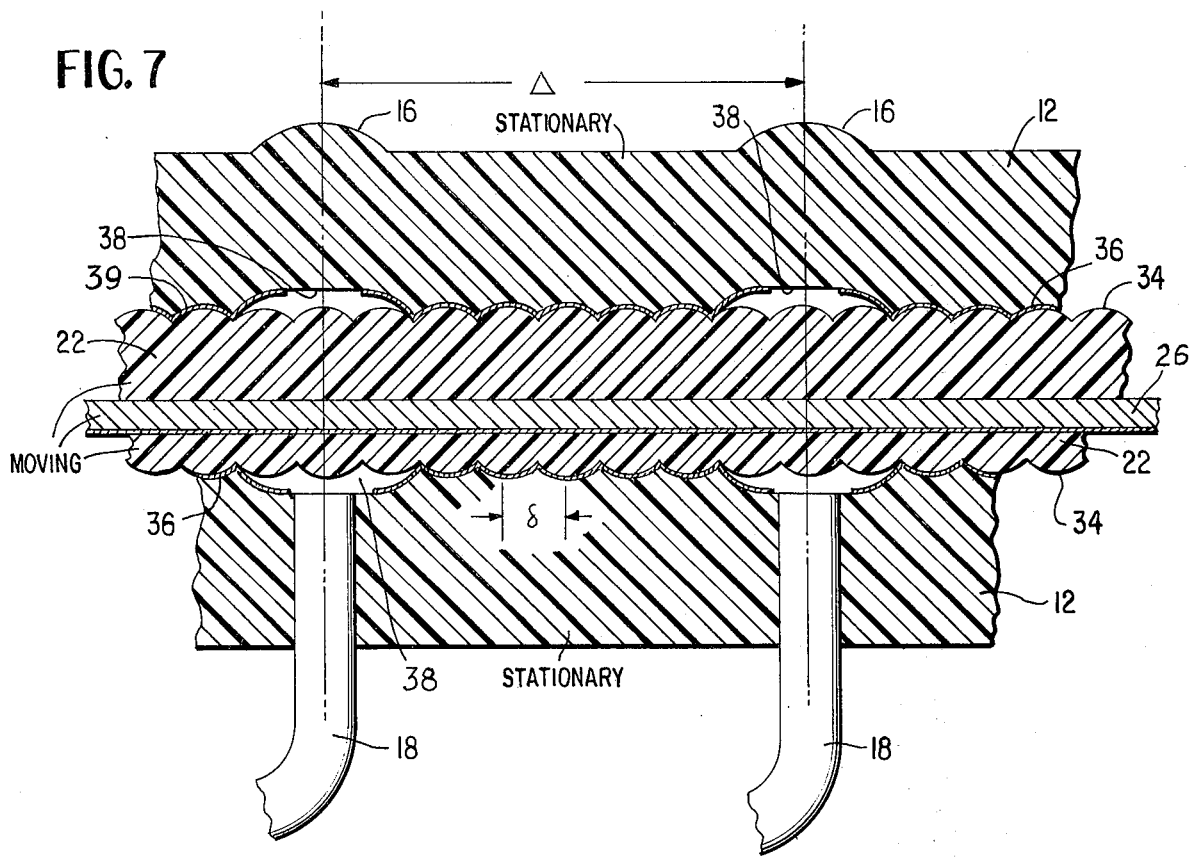

FIG. 7 is a view similar to FIG. 3 and illustrates another embodiment.

Figure 8:
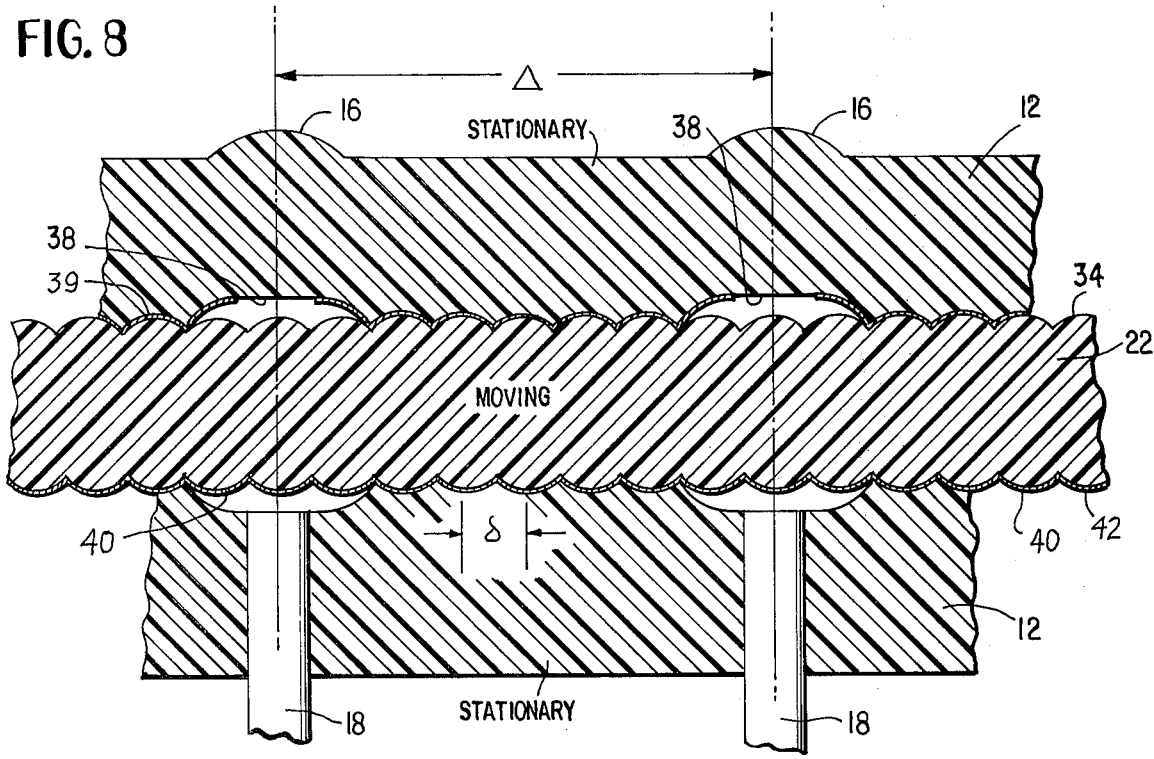

FIG. 8 is a view similar to FIG. 7 and illustrates still another embodiment.

Figure 1:
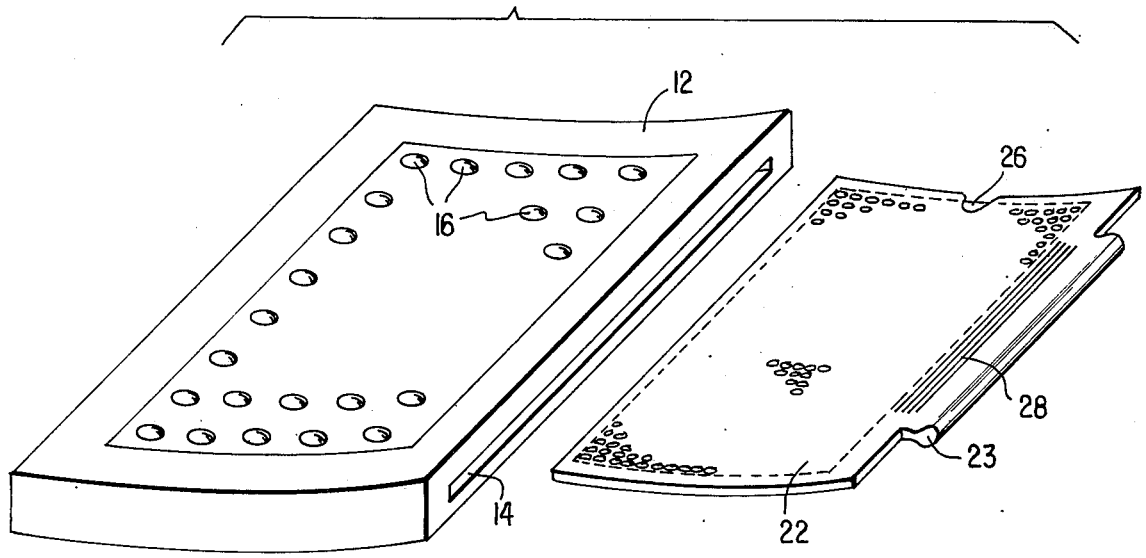
FIG. 1 is a perspective view of an embodiment of the invention wherein the microfiche reader and microfiche carrier are curved. The illuminative system, selector mask, and rear projection screen are not shown.

Referring now to FIG. 1 of the drawings, the numeral 12 denotes a relatively thin container having top and bottom walls and having closed top and bottom edges. One side edge is open to communicate with generally rectangular cavity 14 therein, the cavity adapted to receive carrier 22. Both the container and carrier are slightly curved, as shown, the curvatures being different to thereby maintain proper fit between the two. The numeral 16 denotes any one of a plurality of integral lenses formed on the top surface of the top wall of container 12.

Referring now to FIGS. 2 and 3 of the drawings, the numeral 18 denotes any one of a plurality of optical fibers, known in this art, for conducting light from a source of illumination to a plurality of distributed points over the bottom surface of cavity 14. The numeral 22 denotes a microfiche carrier generally of rectangular form and provided at one edge with a handle portion 23 for manual grasping. The numeral 24 denotes the central portion of the microfiche carrier and is provided with a plurality of lenslettes on its top surface with interlens areas being opaque, all as known in this art. The upper interior surface of the upper wall of container 12 is provided with an opaque coating, except at those areas opposite to projection lenses 16. These non-opaque openings are larger than the lenslettes, shown in my U.S. Pat. No. 3,864,034. The bottom surface of carrier 22 is provided with a pair of registry pins 25 for registering a microfiche 26 accurately over the surface of the carrier 22. The numeral 27 denotes any one of two pressure spheres attached by bail 29 for exerting pressure on the top wall of container 12. As shown at FIGS. 1 and 4 of the drawings, the microfiche carrier 22 is provided with a plurality of ridges 28 which cooperate with complimentary ridges 30 carried by container 12.

It is believed that the operation of the device will be apparent. In operation, the lighting source (not illustrated) is energized and light is piped through optic fibers 18 for exit through their forward ends in the bottom wall of container 12. This light is modulated by the microimages carried by microfiche 26, the modulated light passing through the lenslettes on the top surface of carrier 22, then passing through projection lenses 16 for viewing onto a projection screen (not shown). After one such scene is viewed, the viewer now either pulls or pushes the handle 23 towards the right or towards the left (viewed at FIG. 2) to thereby align a new set of micorimages with respect to the ends of optic fibers 18. This indexing process continues until all of the distinct information sets defined by the microimages carried by microfiche 26 have been exhausted. By reference to FIG. 4 of the drawings, the reader will immediately understand that a movement to the right or to the left of carrier 22 results in a slight spreading apart of the edges of container 12 to permit such movement. After the indexing movement, the edges move back together to assume the indicated configuration.

Referring now to FIG. 5 of the drawings, a modification is illustrated wherein the microfiche carrier 22 itself assumes the form of a relatively thin container having a top entrance along its edge for the reception of microfiche 26. As shown at FIG. 6, the top surface of the carrier 22 of FIG. 5 is provided with integral lenslettes and opaque portions therebetween, such as shown at FIG. 5 of my U.S. Pat. No. 3,864,034 relative to lenslettes 21 and opaque portions 51 thereof, and the bottom surface is provided with condenser lenslettes for condensing the light received from the illuminating optic fibers 18. The mode of operation of the embodiment shown at FIGS. 5 and 6 is the same as that of the earlier described embodiment. That is to say, ridges 28 on the top and the bottom walls of carrier 22 cooperate with similar ridges (not illustrated) on container 12.

Referring now to FIG. 7 of the drawings, still another modification is illustrated wherein the carrier 22 is of the type shown at FIGS. 5 and 6, with the modification that the top and bottom surfaces of the carrier are provided with integral lenslettes, as in the same manner shown at the bottom of the carrier. The lenslettes of FIG. 7 are denoted by the numeral 34 and cooperate with complimentary recess 36 in inner surfaces of container 12. Recesses 38 in container 12 are aligned with optic fibers 18 and are enlarged as indicated. Opaque portions 39 coat recesses 36. The mode of operation of the embodiment of FIG. 7 is the same as that previously described. Namely, indexing movement of carrier 22, to the right/left as viewed at FIG. 7, causes a slight spreading apart of the top and bottom walls of the container 12 during such motion. The lenses 34 thus perform the additional function of indexing elements. Microfiche 26 is carried by and stationary with respect to carrier 22.

Referring now to FIG. 8 of the drawings, and embodiment is illustrated wherein the carrier 22 is provided on its lower surface with Petzval surfaces 40. These Petzval surfaces carry, in turn, photographic emulsion 42. The mode of operation is substantially the same as the mode for the construction of FIG. 7. The difference between these two embodiments is that the micro-images, i.e., micro-information or micro intelligence, are carried by emulsion on Petzval surfaces, instead of on planar emulsion. However, the carrier 22 of both FIG. 7 and 8 has the same indexing action.

In all of the drawings, the upper case dleta denotes the spacing between the projection lenses 16, while the lower case delta denotes the inter-lenslette spacing.

Further, while the above description has treated the apparatus as exhibiting utility as a reader, it will be apparent that it may also be used to record micro information.

I claim:

1. A micro intelligence reader including,
 a. a relatively thin container being open at one edge for the reception of a carrier of micro intelligence,
 b. a microfiche carrier carrying micro intelligence and received within the container,
 c. means for directing illuminating light to a plurality of distributed points over the bottom wall of the container to thereby illuminate the micro intelligence,
 d. means for indexing the micro intelligence carrier with respect to the container,
 e. the top wall of the container carrying projection lenses, light from the illumination directing means passing through the micro intelligence on the microfiche carrier and through the projection lenses and adapted to fall on a projection screen for viewing.

2. The reader of claim 1 wherein the means (d) is defined by interengaging ridges on both the container and the carrier, the ridges running parallel to the said open edge of the container, at least one of said container and carrier being resiliently yieldable in a direction orthogonal to the carrier movement to thereby permit inter-ridge translation to thereby allow stepped relative movement between the container and the carrier.

3. The reader at claim 2 wherein the walls of the container are resilient.

4. The reader of claim 2 wherein the means (c) for directing illuminating light includes light-carrying optic fibers whose light output ends are optically aligned with the projection lenses.

5. The reader of claim 2 wherein the micro information is carried on one surface of the carrier.

6. The reader of claim 5 wherein the said one carrier surface is provided with Petzval surface.

7. The reader of claim 2 wherein the micro information is carried inside a recess in the carrier.

8. The reader of claim 2 wherein the interior surfaces of the top and bottom walls of the container and both surfaces of the carrier are provided with inter-engaging ridges, whereby both surfaces of the carrier are simultaneously aligned with the means for directing illuminating light.

9. The reader of claim 2 wherein the microfiche carrier is provided with integral lensettes on one surface thereof, the interridge spacing being equal to the inter-lensette spacing.

10. The reader of claim 1 wherein the indexing means (d) includes integral nodules on both top and bottom surfaces of the carrier, which nodules are received by complementary recesses on interior surfaces of the said container.

11. The reader of claim 10 wherein one interior surface of the container is provided with an opaque coating, except at those regions opposite the projection lenses, the opaque portions defining aperture stops.

12. The reader of claim 1 wherein the container and the microfiche carrier are both curved, but of different curvatures, whereby contact force is maintained between the container and the carrier.

13. The micro intelligence reader of claim 1 wherein the microfiche carrier is provided with integral lensettes on at least one surface thereof, and wherein at least one wall of the container is provided with recesses complementary to and receiving said lensettes, whereby the lensettes and their complementary recesses define the indexing means, whereby the lensettes perform the dual function of, additionally, indexing the microfiche carrier relative to the thin container.

14. The micro intelligence reader of claim 13 wherein a surface of the microfiche carrier is provided with integral Petzval surfaces, the Petzval surfaces being received by complementary recesses in one wall of the container, whereby the Petzval surfaces and their complementary recesses define the indexing means.

15. The micro intelligence reader of claim 14 wherein the Petzval surfaces are coated with photographic emulsion, the emulsion carrying the micro information.

16. The reader of claim 13 wherein the complementary recesses which receive the lensettes are opaquely coated.

17. The reader of claim 1 wherein the top wall of the container, which carries the projection lenses, is interiorly provided with recesses optically aligned with the projection lenses.

* * * * *